3,256,338
STABILIZERS FOR KETONE SOLVENTS
Richard F. Robey, Cranford, Robert Drogin, Linden, and Albin F. Turbak, New Providence, N.J., assignors to Esso Research and Engineering Company, a corporation of Delaware
No Drawing. Filed Jan. 28, 1963, Ser. No. 254,501
4 Claims. (Cl. 260—593)

This invention relates to the stabilization of lower alkyl ketones. In particular this invention relates to novel compositions of matter comprising a lower $C_3$-$C_8$ aliphatic ketone containing trace amounts of the following specific stabilizing additives: citric acid, lecithin, sodium hexametaphosphate, 2-butanone oxime, and sodium diethyldithiocarbamate. Still more specifically this invention relates in a preferred embodiment to the stabilization of lower ketones, preferably methylisobutyl ketone with these additives mixed with di-tertiary butyl para-cresol, preferably citric acid and di-tertiary butyl para-cresol.

Lower dialkyl ketones containing from 1 to 4 carbon atoms per alkyl group in accordance with one commercial method are prepared by the catalytic dehydrogenation of secondary alcohols. For example, methylethyl ketone may be produced by subjecting secondary butyl alcohol to temperatures of 600–960° F. in the presence of a Group IIB metal oxide preferably supported on a carrier. Other catalysts are also known to effect this reaction. Also, other dialkyl ketones may be produced by reacting corresponding secondary alcohols such as hexanol-2 which may be converted to methyl butyl ketone, pentanol-2 to methyl propyl ketone, pentanol-3 to diethyl ketone, etc. In commercial manufacturing plants the crude product as it comes from the dehydrogenation unit comprises major amounts of the desired ketone with minor amounts of the unreacted feed and byproduct contaminants such as other lower molecular weight ketones and/ or alcohols resulting from a certain degree of cracking within the reaction vessel. Water may also be present in the crude reaction mixture. The ketone is then fractionally distilled to obtain a substantially pure product. Various techniques for fractional distillation are employed including the use of water which aids in the separation of the ketone from the corresponding alcohol. When water is employed in substantial amounts the process is described as an extractive distillation which, for example, may result in recovering the aqueous unreacted alcohol as a bottoms extract and the relatively pure ketone as an overhead raffinate from the extractive distillation unit.

The particular manner in which the ketone is purified is not important to the successful operation of the present invention. Ketones are, however, well known commercial solvents which in accordance with consumer demand must have an extremely high purity. Typical minimum specification for methyl ethyl ketone will run about 99.4%. In order to meet the standards required, these ketones must be substantially colorless, i.e., water white, and have a low acid number of, for example, <0.002. The term "acid number" as employed herein refers to grams of acid per hundred grams of sample, the acid being calculated as acetic acid. Standard alkali titration techniques are employed to determine this acid number. Other processes for the production of ketones may lead to a product contaminated with impurities which will render the product subject to degradation.

Despite the high purity product which is obtained by extensive and elaborate fractionation techniques, it has been found that storage of the high purity ketone results in the formation frequently of color bodies such as yellow, amber, green and brown. These color bodies cause the specified water white liquid product to assume usually a yellow color. Since discolored ketones are objectionable to the consumer, such discolored products would normally require extensive refinishing techniques before they could be sold. It has now been found that the acid number also often increases in storage to a point where it no longer meets specification. This also requires extensive and costly refinishing steps. The particular mechanism for this degradation of product and/or increase of acidity is not known; however, it is believed that the particular contaminants present in the high purity ketone catalyze in the presence of air the formation of diketones, e.g. diacetyl or 2,3-butanedione, by oxidation of the high purity product ketone itself. This is extremely surprising in that text books on organic chemistry are in agreement to the effect that ketones are relatively stable towards oxidizing agents and in fact they will not reduce ammoniacal silver nitrates, gold salts or Fehling's solution. The degradation product formed on storage is ordinarily higher boiling than the ketone and can be separated from the ketone by fractional distillation. Obviously, the cost of the fractional distillation plus the cost of the product lost, e.g. up to about 10% bottoms, makes it especially desirous to avoid the formation of degradation product and to promote stabilization of the ketone. It is further believed that the contamination is also probably promoted by external contaminants introduced from the transportation and storage facilities, e.g. chloride and iron salts. In any event it is not intended to limit this invention by any theory of the mechanism involved, the surprising and effective improvement obtained being the invention now taught.

For a better understanding of the invention, reference is now had to Table I which sets forth the acidity and color of several different large samples of methyl ethyl ketone before and after storage. It will be noted from the table that the original acidity is less than about 0.002 and the original color approximately 0–5 Hazen. The acidity and color increased substantially on storage over 2 and 4 month periods.

*Table I*
STORAGE STABILITY OF MEK

| Sample | Original | | Time of Storage | After Storage | |
|---|---|---|---|---|---|
| | Acidity | Color | | Acidity | Color |
| A | 0.001 | 0 | 2 mos. (approx.) (Jan.–March) | 0.0061 | 30 |
| B | 0.0016 | 5 | 2 mos. (April–June) | 0.037 | 10 |
| C | 0.001 | 0 | 4 mos. (July–November) | 0.013 | 15 |

To further demonstrate the instability of high purity ketones, reference may be had to the following table which shows the results of an accelerated storage test on methyl ethyl ketone. It will be noted from the table that the original high purity product employed had an acid number below the specification maximum. The increase in acidity by air blowing in an accelerated storage test is shown. After only 7 hours the previously pure ketone contained an acid number which is unacceptable to the trade for many purposes, a ketone product which must be rerun at considerable expense to the manufacturer.

Table II
ACCELERATED STORAGE TESTS

| Time (with air): | Acid number |
|---|---|
| 0 hour | 0.0019 |
| 7 hours | 0.012 |
| 23 hours | 0.056 |
| 30 hours | 0.086 |
| 48 hours | 0.1124 |

The accelerated storage test is effected by boiling methyl ethyl ketone under reflux and at the same time bubbling air through the ketone for the number of hours set forth above at a rate of about 0.5 cubic ft./hr.

To demonstrate the effect of storage on color, a portion of ketone having an acidity of Sample A in Table I was subjected to the accelerated storage test and the color was determined after 2, 4 and 20 hours. Initial color on a Hazen scale was 0–5 or substantially water white. After 2 hours of refluxing with bubbled air, the color formed with a Hazen rating of 10; after 4 hours the color had a Hazen rating of 30; and after 20 hours the product turned greenish. Reference is now had to Table III which shows a relationship between acidity and color.

Table III

| Sample | Time of Heating (Air) | Color [1] | Acidity |
|---|---|---|---|
| A | 0 Hour | 0–5 | 0.0011 |
| A | 2 Hours | 10 | 0.0099 |
| A | 4 Hours | 30 | 0.0150 |
| A | 20 Hours | 30+ (green) | 0.038 |

[1] Estimated Hazen ratings. The Hazen color scale is not an especially good technique for measuring color of stored methyl ethyl ketone. The eye can pick up differences more easily than the colorimeter. When methyl ethyl ketone goes off color in storage as measured by acidity, the Hazen colors are "no match". Sometimes they have a green cast, at other times yellow, brownish, etc. and the colorimeter cannot measure these differences. The color is therefore only an estimate and is not intended to reflect a true Hazen rating.

To combat this apparent degradation by oxidation of ketones in storage, a number of known anti-oxidant-stabilizers were added in amounts which would normally be sufficient to stabilize an organic compound from oxidation. These inhibitors include Sustane, i.e., butyl hydroxy anisole ($C_{11}H_{16}O_2$), tocopherol, i.e. vitamin E ($C_{20}H_{50}O_2$), and tertiary butyl catechol ($C_{10}H_{14}O_2$). A sample of methyl ethyl ketone having a color rating of 0 and an acidity of 0.0004 was employed. The control was refluxed with air as described previously with a resulting increase in color to 5 and 10 after 7 and 14 hours and an increase in acidity to 0.0014 after 7 hours, and to 0.0120 after 14 hours. With Sustane after 7 hours the acidity was 0.0024 and the color was 50. With tocopherol the color was 30 and the acidity was above specification. With tertiary butyl catechol the color was also 30 and the acidity was up to 0.020. Other substances with poor inhibitory action are secondary and tertiary alcohols, water, and acetaldehyde had some but not outstanding inhibitory action. Aluminum coupled to iron was an inhibitor under certain conditions, but reproducible results could not be obtained. Propyl gallate, phosphoric acid, dilaurylthiodipropionate, sodium nitrite, sodium citrate, hexamethylphosphoramide, sodium bisulfite, "Sustane," Du Pont "Metal Deactivator," or "Tenamene-2" produced foreign color in MEK, and saccharin and triphenyl phosphite were completely ineffective. It is apparent therefore that the commercial anti-oxidants tried actually worsened both the acidity and color over the unstabilized control treated by refluxing with air over a similar period of time.

In accordance with this invention it has been found that the following additives have an unexpected stabilization effect on lower alkyl ketones even when added in a few parts per million (p.p.m.): 2-butanone-oxime, citric acid, sodium hexametaphosphate, lecithin, sodium diethyldithiocarbamate and mixtures of these with di-tertiary butyl-p-cresol. It has further been found that the mixed stabilizers in combination exert a synergistic effect. The amount of stabilizer or total stabilizers to be added may be 1 to 1000 p.p.m., preferably 5 to 30 p.p.m.

The present invention will be more clearly understood from a consideration of the following examples presenting data obtained in the laboratory.

EXAMPLE 1

The following additives were tested and found to be effective (except for di-tertiary butyl-p-cresol) in stabilizing methyl ethyl ketone (MEK) in an accelerated storage test. This test was conducted by heating the ketone for several hours at 80° C. in the presence of oxygen or air and steel and the amounts of yellow diacetyl was measured spectrophotometrically. In all cases cited the color observed could be accounted for entirely by the acetyl formed and was therefore not due to any degradation of the additive.

Table IV

| Additive | Additive Conc., p.p.m. | Rate of Diacetyl Formation, Percent of Reference |
|---|---|---|
| Citric acid [a] | 20 | 12 |
| Sodium diethyldithiocarbamate | | 24 |
| Sodium hexametaphosphate [a] | | 26 |
| Lecithin | | 32 |
| 2-butanone oxime | | 34 |
| Di-tertiary butyl-p-cresol | | 73 |
| None (reference) | | 100 |
| 2-butanone oxime | 10 | 19 |
| Lecithin | | 28 |
| Citric acid [a] | | 35 |
| Ascorbic acid [a] | | 41 |
| Sodium hexametaphosphate [a] | | 60 |
| Di-tertiary butyl-p-cresol | | 78 |
| None (reference) | | 100 |
| Sodium diethyldithiocarbamate | 2 | 10 |

[a] Added as aqueous solution, 0.01 vol. percent on MEK.

EXAMPLE 2

A number of the preferred additives were used to stabilize methyl ethyl ketone and were found not to harm routine inspections of the product in tests shown below.

Table V
ROUTINE INSPECTION CHARACTERISTICS OF MEK PRODUCT ARE NOT HARMED SIGNIFICANTLY BY ADDITIVES

| Inspection | Additive [a] | | | | | Typical Commercial Specification |
|---|---|---|---|---|---|---|
| | None | 2-butanone oxime | Lecithin | Citric acid [b] | Sodium hexametaphosphate [b] | |
| Acidity, as HOAc, wt. percent | 0.001 | 0.001 | 0.001 | 0.002 | 0.001 | 0.002 max. |
| Color, Pt-Co scale | 5 | 5 | 5 | 5 | 5 | 10 max. |
| Dist'n. Temp., °C.: | | | | | | |
| Initial | 79.2 | 79.2 | 79.2 | 79.2 | 79.3 | 78.6 min. |
| Dry Point | 79.7 | 79.7 | 79.7 | 79.8 | 79.8 | 80.6 max. |
| Sp. Gravity, 20/20 c | 0.8060 | 0.8060 | 0.8060 | 0.8060 | 0.8060 | 0.805–0.807. |
| Nonvolatile Matter, gram 100 mL | 0.0002 | 0.0002 | 0.0008 | 0.0001 | 0.0007 | 0.002 max. |
| Purity, as MEK, wt. percent | 99.9 | 99.9 | 99.9 | 99.9 | 99.9 | 99.3 min. |
| Water content, wt. percent | 0.05 | 0.04 | 0.04 | 0.04 | 0.06 | 0.2 max. |

[a] Concentration of additive, 10 p.p.m. by wt.
[b] Added as aqueous solution, 0.01% solution in MEK.

EXAMPLE 3

This example presents results obtained in stabilizing methyl isobutyl ketone (MIBK) with various preferred inhibitors and combination of inhibitors in the presence also of contaminants which accelerate the formation of impurities. The commercial MIBK used was prepared by the normal process of condensation of acetone to mesityl oxide followed by hydrogenation to MIBK and had a purity of above 99%.

EXAMPLE 5

The data presented below present an actual storage test showing again the synergistic effect described in Example 4 with also data on the amount of peroxides and acidity formed.

*Table VI*

PEROXIDATION OF MIBK IS CATALYZED BY DISSOLVED CHLORINE AND IRON IN THE PRESENCE OF STEEL, BUT INHIBITED BY BHT [a]

| Contaminants Added, p.p.m. | | Rate of Peroxidation, p.p.m. act. O per day [b] | Inhibitor Added [c] | Metal Present [d] | Rate of Diketone Formation, p.p.m. per day [e] |
|---|---|---|---|---|---|
| Chloride | Iron | | | | |
| 0.0 | 0.0 | 8.5 | None | Rusty steel | 10 |
| 1.5 | 0.0 | 0.0 | BHT | do | 22 |
|  |  | 0.6 | Citric acid plus BHT | do | 8 |
|  |  | 21 | None | None | 14 |
|  |  | 26 | do | Clean zinc | 18 |
|  |  | 29 | Citric acid | Rusty steel | 32 |
|  |  | 43 | None | do | 90 |
|  |  | 48 | do | Clean steel | 21 |
| 1.3 | 0.7 | 15 | do | Clean zinc | 77 |
|  |  | 56 | Citric acid plus BHT | Rusty steel | 26 |
|  |  | 137 | None | do | 86 |

[a] BHT is butylated hydroxytoluene (di-t-butyl-p-cresol).
[b] 50 ml.-commercial MIBK, lots designation B, having a purity of above 99%, subjected to accelerated storage test heating in an ASTM-D-525 glass-lined bomb at 80° C. for 22-114 hours under 10 p.s.i.g. initial oxygen pressure.
[c] Inhibitor concentration was 0.001% when added.
[d] Metal test piece was 16-gauge, 0.125 x 0.125 inch in size.
[e] Increase in diketone content (yellow color body) during test determined spectrophotometrically.

EXAMPLE 4

The synergistic effect of adding the two inhibitors citric acid and butylated hydroxy toluene is seen from the following data.

*Table VII*

MIBK DISCOLORATION INHIBITED MARKEDLY BY THE SYNERGISTIC ACTION OF A METAL DEACTIVATOR AND A CONVENTIONAL ANTIOXIDANT

| Diketone Formation, p.p.m./day at 176° F.[1] | Calculated Time for Discoloration at 86° F., days [2] | Metal Present [3] | Inhibitor Present [4] |
|---|---|---|---|
| 85 | 25 | Rusty steel | None. |
| 29 | 70 | do | Citric acid. |
| 22 | 90 | do | BHT.[5] |
| 21 | 90 | Clean steel | None. |
| 18 | 110 | Clean zinc | None. |
| 14 | 140 | None | None. |
| 7 | 290 | Rusty steel | Citric acid and BHT.[5] |

[1] 50 ml. of a commercial sample of MIBK, lot designation B, containing 1.5 p.p.m. added chloride as HCl, heated in an ASTM-D-525 glass-lined bomb under 10 p.s.i.g. initial oxygen pressure for one day. Increase in diketone content measured spectrophotometrically.
[2] Calculation based upon the 100-fold difference in rate of diketone formation at 176° F. (80° C.) and at 86° F. (30° C.) and upon the observation that about 20 p.p.m. diketone (as diacetyl) are required to produce off-spec. color.
[3] Metal test piece when present was 16-gage, 0.125 x 0.125 inch in size.
[4] Inhibitor concentration was 0.001% when added.
[5] BHT is butylated hydroxytoluene (di-t-butyl-p-cresol, Parabar-441, Tenamene-3).

*Table VIII*

DISCOLORATION AND PEROXIDATION OF AIR-SATURATED MIBK EFFECTIVELY INHIBITED DURING STORAGE AT 104° F. IN CONTACT WITH RUSTY STEEL BY A DUAL ADDITIVE

| Test | Time, Days | Inhibitor Added | | |
|---|---|---|---|---|
| | | None | 0.001% BHT [a] | 0.001% BHT [a] plus 0.001% Citric Acid |
| Diketone, p.p.m. (as diacetyl) [b] | 0 | 0 | 0 | 0 |
| | 7 | 24 | 0 | 2 |
| | 15 | 32 | 36 | 8 |
| | 32 | 57 | 48 | 19 |
| Spectral Yellow Value [c] | 0 | 0 | 0 | 0 |
| | 7 | 14 | 0 | 1 |
| | 15 | 18 | 19 | 5 |
| | 32 | 27 | 24 | 12 |
| Peroxide, p.p.m. active O | 0 | 6 | -- | 5 |
| | 7 | 21 | 5 | 5 |
| | 15 | 38 | 17 | 5 |
| | 32 | 70 | 142 | 30 |
| Acidity, wt. percent as Acetic | 0 | 0.003 | 0.003 | 0.004 |
| | 32 | 0.011 | 0.010 | 0.003 |

[a] BHT is butylated hydroxytoluene (di-t-butyl-p-cresol).
[b] Diketone is yellow color body formed by autooxidation and is determined spectrophotometrically.
[c] Spectral yellow value is spectrophotometric interpolation of ASTM Platinum-Cobalt color. Maximum color currently specified for MIBK product is 15.

It is to be understood that this invention is not limited to the specific examples which have been offered merely as illustrations and that modifications may be made without departing from the spirit of the invention.

What is claimed is:

1. A dialkyl ketone of 3 to 8 carbon atoms stabilized with 0.0001 to 0.1 wt. percent of an inhibitor selected from the group consisting of citric acid, lecithin, sodium hexametaphosphate, 2-butanone oxime, sodium diethyldithiocarbamate and mixtures of these with di-t-butyl-p-cresol.

2. Methyl ethyl ketone stabilized with 0.0001 to 0.1 wt. percent of an inhibitor selected from the group consisting of citric acid, lecithin, sodium hexametaphosphate, 2-butanone oxime, and sodium diethyldithiocarbamate and mixtures of these with di-t-butyl-p-cresol.

3. Methyl isobutyl ketone stabilized with 0.0001 to 0.1 wt. percent of an inhibitor selected from the group consisting of citric acid, lecithin, sodium hexametaphosphate, 2-butanone oxime, sodium diethyldithiocarbamate, and mixtures of these with di-t-butyl-p-cresol.

4. Methyl isobutyl ketone stabilized with 0.0001 to 0.1 wt. percent of a mixture of citric acid, and di-t-butyl-p-cresol.

References Cited by the Examiner

UNITED STATES PATENTS 2,105,284  1/1938  Groll et al. _____ 260—593 X

OTHER REFERENCES

Rosenwald et al.: Ind. & Eng. Chem., vol. 42, pages 162–5 (1950), 260–624.

LEON ZITVER, *Primary Examiner.*

LORRAINE A. WEINBERGER, *Examiner.*

D. D. HORWITZ, *Assistant Examiner.*